(12) United States Patent
Salas

(10) Patent No.: US 11,608,623 B2
(45) Date of Patent: Mar. 21, 2023

(54) SINGLE-HAND USE COLLAPSIBLE ANTI-BACTERIAL PLUNGER

(71) Applicant: Michelle Salas, Sterling, MA (US)

(72) Inventor: Michelle Salas, Sterling, MA (US)

( * ) Notice: Subject to any disclaimer, the term of this patent is extended or adjusted under 35 U.S.C. 154(b) by 0 days.

(21) Appl. No.: 17/224,027

(22) Filed: Apr. 6, 2021

(65) Prior Publication Data

US 2022/0316195 A1 Oct. 6, 2022

(51) Int. Cl.
*E03C 1/308* (2006.01)
*A01N 59/16* (2006.01)

(52) U.S. Cl.
CPC .............. *E03C 1/308* (2013.01); *A01N 59/16* (2013.01)

(58) Field of Classification Search
CPC .................................. E03C 1/308; B25G 1/04
USPC ......................................................... 4/255.11
See application file for complete search history.

(56) References Cited

U.S. PATENT DOCUMENTS

| 3,021,532 | A | * | 2/1962 | Gross | ....................... | E03C 1/308 |
| | | | | | | 4/255.11 |
| 6,055,680 | A | * | 5/2000 | Tolbert | ..................... | E03C 1/308 |
| | | | | | | 4/255.11 |
| 6,719,134 | B2 | | 4/2004 | Phillips | | |
| 6,880,197 | B2 | | 4/2005 | Katz | | |
| 7,017,197 | B1 | * | 3/2006 | Williams | ................ | E03C 1/308 |
| | | | | | | 4/255.11 |
| 7,089,605 | B2 | | 8/2006 | Jiang | | |
| 7,308,728 | B2 | | 12/2007 | Haviv | | |
| 7,430,779 | B1 | | 10/2008 | Garry | | |
| D809,720 | S | * | 2/2018 | Salas | .............................. | D32/14 |
| 2005/0172385 | A1 | * | 8/2005 | Jiang | ....................... | E03C 1/308 |
| | | | | | | 4/255.05 |
| 2009/0095646 | A1 | | 4/2009 | Reynolds | | |
| 2010/0077541 | A1 | * | 4/2010 | Stein | ....................... | E03C 1/308 |
| | | | | | | 4/255.11 |
| 2010/0313345 | A1 | * | 12/2010 | Stein | ....................... | E03C 1/308 |
| | | | | | | 4/255.11 |
| 2013/0139309 | A1 | * | 6/2013 | Bleecher | .................. | C09D 5/00 |
| | | | | | | 427/421.1 |
| 2015/0082567 | A1 | | 3/2015 | Perry | | |
| 2015/0090717 | A1 | | 4/2015 | Marcell | | |
| 2015/0320269 | A1 | | 11/2015 | Ward | | |
| 2016/0000281 | A1 | * | 1/2016 | Butts | ....................... | A47K 17/00 |
| | | | | | | 206/349 |
| 2018/0163383 | A1 | * | 6/2018 | Wang | ....................... | E03C 1/308 |
| 2019/0270192 | A1 | * | 9/2019 | Guthrie | ..................... | B25G 1/04 |

FOREIGN PATENT DOCUMENTS

| EP | 1442692 | 8/2004 |
| GB | 2371474 | 7/2002 |
| WO | 2017174976 | 10/2017 |

* cited by examiner

*Primary Examiner* — Benjamin R Shaw

(74) *Attorney, Agent, or Firm* — Lambert Shortell & Connaughton; David J. Connaughton, Jr.; Justin P. Tinger

(57) ABSTRACT

A single-hand use collapsible anti-bacterial plunger and base is disclosed herein. The single-hand use function of the present disclosure is facilitated by a locking mechanism in the handle, connection joints in the shaft, and a stabilizing foot tab on the base. The collapsible feature of the present disclosure is facilitated by a telescoping shaft. The anti-bacterial feature of the present disclosure is accomplished by an antimicrobial or anti-bacterial agent on the telescoping shaft.

18 Claims, 13 Drawing Sheets

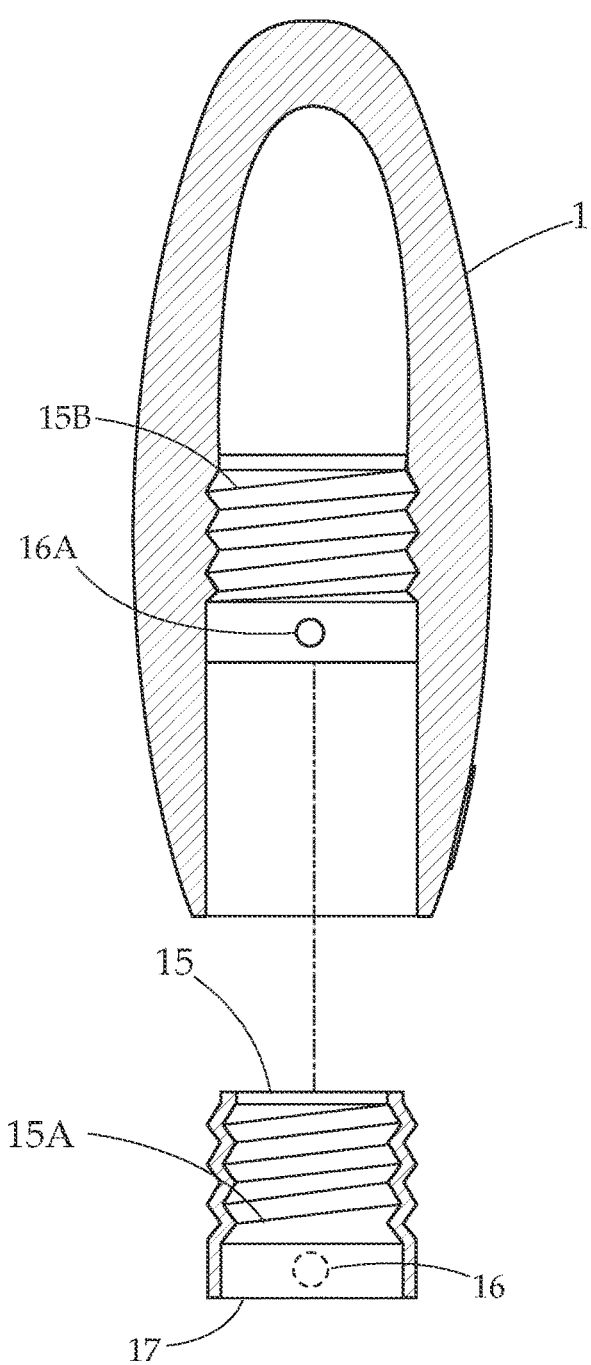
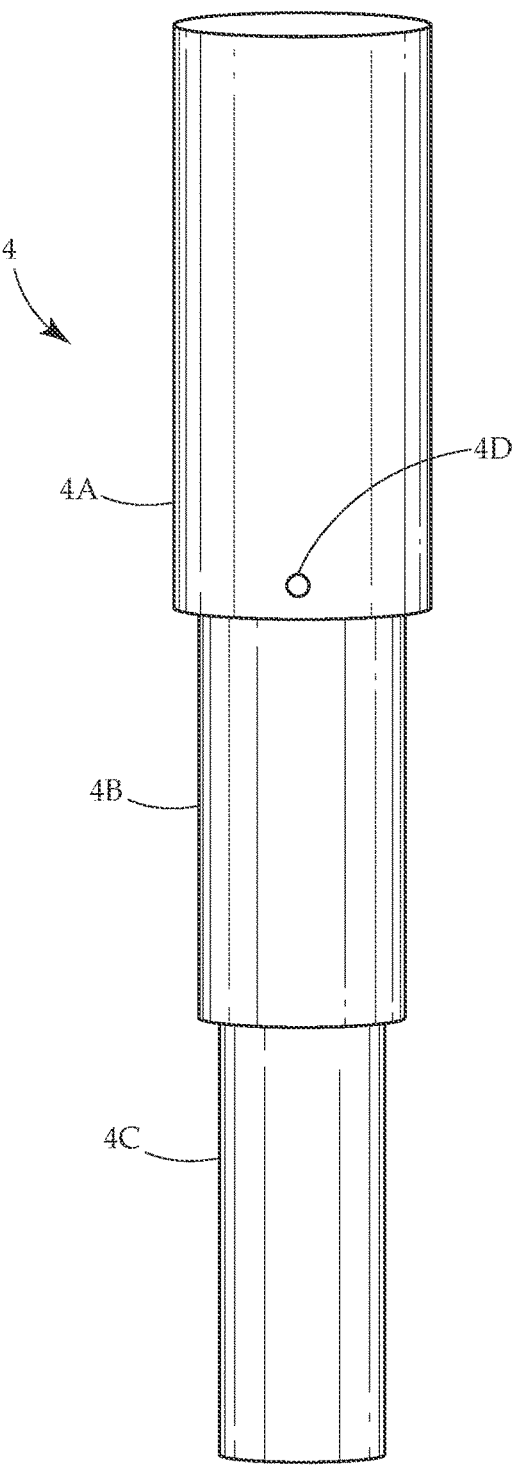
Fig. 3
Fig. 4

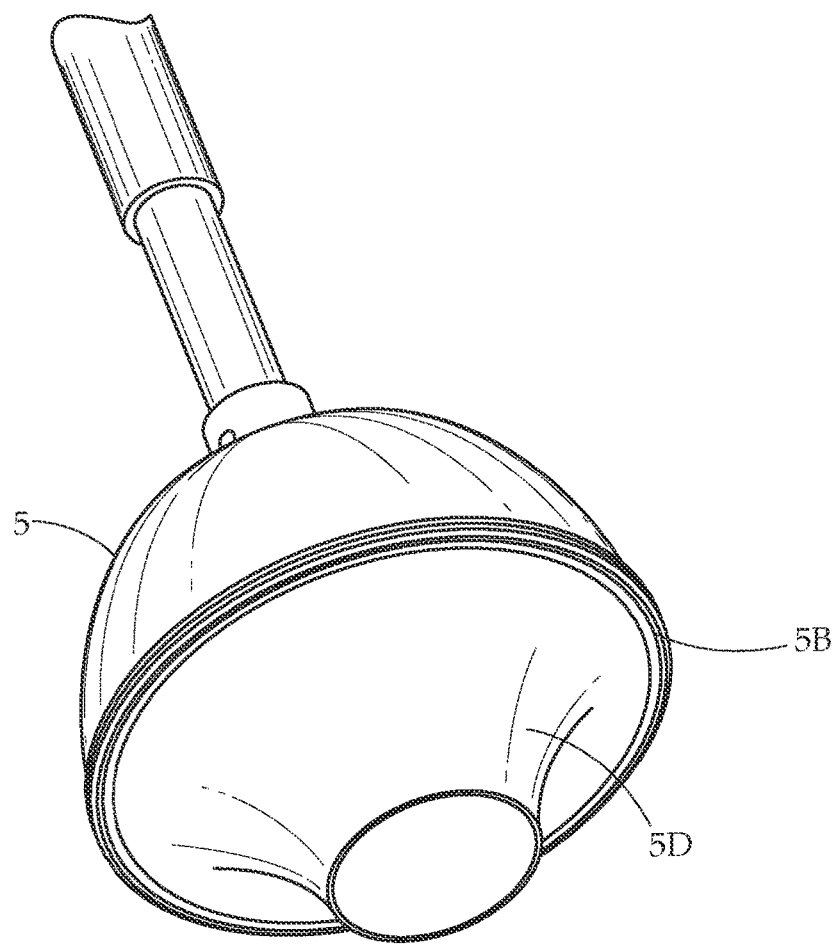
*Fig. 16*
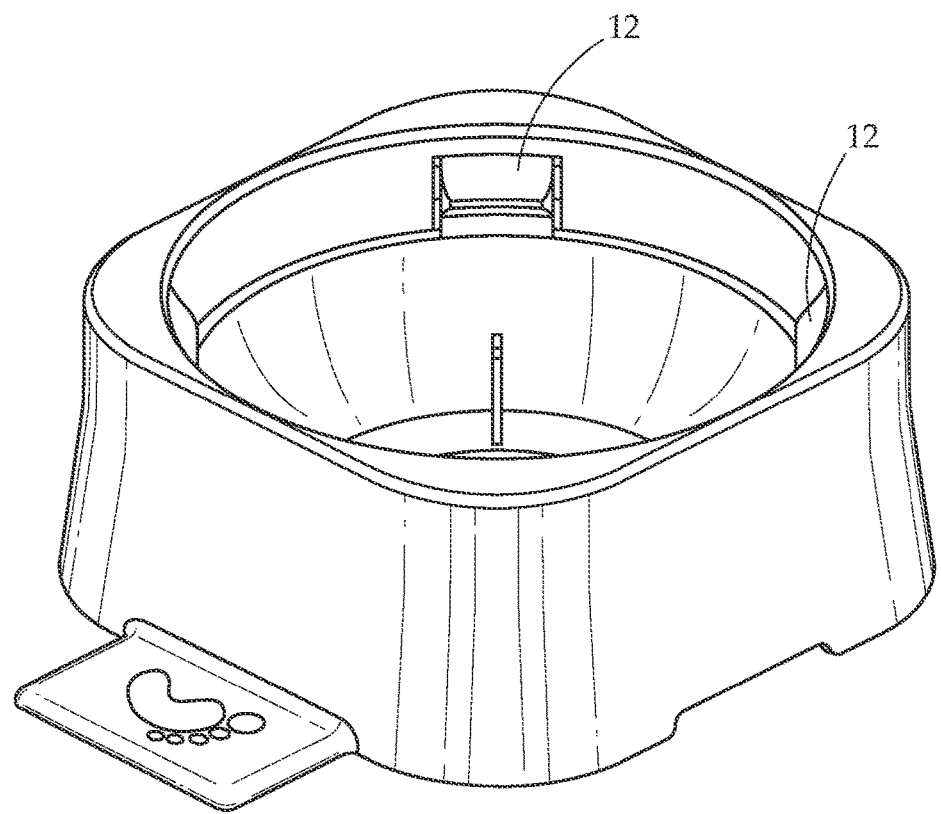

SINGLE-HAND USE COLLAPSIBLE ANTI-BACTERIAL PLUNGER

BACKGROUND

Technical Field

The present disclosure relates generally to plungers. More particularly, the present disclosure relates to a single-hand use collapsible anti-bacterial plunger with a telescoping shaft infused with an antimicrobial/anti-bacterial agent, such as a polymer-metal composite designed to have antimicrobial/anti-bacterial properties.

Description of Related Art

The modern plunger was invented in the late 1800s and was initially referred to as a "vent-clearer," marketed as a "force cup." Throughout the years, various plungers for different types of uses have been developed.

Plungers are typically used in bathrooms to clear clogged toilets, or in kitchens to clear drains. Plungers typically comprise a handle, a shaft, and a rubber cup connected to the distal end of the shaft. Plungers are effective at clearing clogged pipes, drains, toilets, and the like because when the cup is pushed against an opening, the air or water in the opening is compressed and a vacuum is created when the cup is essentially flat. When the cup is pulled to its resting position, the vacuum decompresses, and the air or water in the opening is pulled in the direction of the vacuum. This reciprocal process is repeated until the blockage is dislodged.

There are a multitude of problems with the modern plunger and an even greater number of potential solutions to these problems. Some of these problems include the fact that plungers come into contact with bacteria, and plungers with a fixed handle are difficult to store. While plungers with an unfixed or detachable handle have helped to mitigate the lack of storage options, these plungers require the user to touch the bacteria-ridden shaft of the plunger.

Therefore, what is needed is a single-hand use collapsible anti-bacterial plunger having the following characteristics and benefits over the prior art.

SUMMARY

The subject matter of this application may involve, in some cases, interrelated products, alternative solutions to a particular problem, and/or a plurality of different uses of a single system or article.

It is an object of the present disclosure to provide a single-hand use collapsible anti-bacterial plunger that has both antimicrobial or anti-bacterial properties and convenient collapsing features for easy storage. It is another object of the present disclosure to provide a base that facilitates the single-hand use and storage functions of the plunger.

In one aspect of the present disclosure, a telescoping shaft may be connected to a handle at one end of the shaft and a suction cup at the opposite end of the shaft. The plunger may then be placed in a base where it may be collapsed for convenient storage.

In another aspect of the present disclosure, the base may have a foot tab attached to it, where the user may put their foot to stabilize the base while extending and collapsing the plunger.

In yet another aspect of the present disclosure, the handle may have an aperture. The aperture may be internally threaded, and an externally threaded locking screw piece with another aperture may be connected by screwing the locking screw piece into the handle. The telescoping shaft may then be connected to the handle through the aperture of the externally threaded locking screw piece.

In another aspect of the present disclosure, the telescoping shaft may be comprised of a plurality of hollow rods with proximal and distal ends, where the rods may be either internally threaded at the distal ends, externally threaded at the proximal ends, or both. The rods may be connected to each other by connecting the proximal ends to the distal ends. In some embodiments, rods with internal threading at their distal ends may have a larger area than the rods connected to the distal ends by external threading at their proximal ends. The tapering area of each successive hollow rod may allow the telescoping shaft to collapse and extend.

In yet another aspect of the present disclosure, the telescoping shaft may be covered with at least one layer of an antimicrobial agent. The antimicrobial agent may be a polymer-metal composite designed to have antimicrobial properties. In some embodiments, the polymer-metal composite may be polypropylene infused with silver ions.

In another aspect of the present disclosure, the suction cup has a rounded top with a connector attached at or near the apex of the rounded top. The telescoping shaft may be connected to the connector by a last hollow rod of the shaft with no internal threading at the distal end of the last rod.

In yet another aspect of the present disclosure, the suction cup may also have an annular ridge that encompasses the circumference of the bottom of the cup.

In another aspect of the present disclosure, the suction cup may also have a hollow baffle attached to the bottom of the cup. The conical baffle may extend away from the cup, and the portion of the baffle furthest from the cup may be substantially narrower than the portion of the baffle attached to the bottom of the cup.

In yet another aspect of the present disclosure, the connector may have a hollow cylindrical shape with a plurality of circular holes, wherein, the distal end of the telescoping shaft may be attached.

In another aspect of the present disclosure, the base may have an opening where the suction cup of the plunger may be placed. In some embodiments, the base may have a foot tab attached to a side of the base that may be perpendicular to the side where the opening for the suction cup is located. The foot tab may assist the user in collapsing and extending the plunger with one hand.

In yet another aspect of the present disclosure, the opening of the base may have at least one locking flap for engaging the annular ridge of the suction cup. The at least one locking flap may secure the plunger in place while the user collapses and extends the plunger with one hand. In some embodiments, the opening may also have at least one air slot within the opening. The at least one air slot may allow for venting to facilitate the evaporation of water that may collect at the bottom of the opening.

In another aspect of the present disclosure, the handle of the plunger may have directional instructions for the user. In some embodiments, the foot tab of the base may also have directional instructions.

In yet another aspect of the present disclosure, the handle may be connected to a telescoping shaft, which may be connected to a brush. In some embodiments, the telescoping shaft may be connected to both a brush at its distal and a suction cup at its distal end, simultaneously. Moreover, in some embodiments, the base may be shaped for engaging with a brush, and in other embodiments, the base may be shaped for engaging both the brush and the suction cup.

It should be understood that the various elements of the present disclosure utilized in different embodiments may be of varying sizes and shapes without straying from the scope of the present invention.

BRIEF DESCRIPTION OF THE DRAWINGS

FIG. 3 provides a partially exploded, cross-sectional perspective view of another embodiment of the present invention.

FIG. 4 provides a perspective view of another embodiment of the present invention.

FIG. 16 provides a perspective view of another embodiment of the present invention.

DETAILED DESCRIPTION

Figure 1:
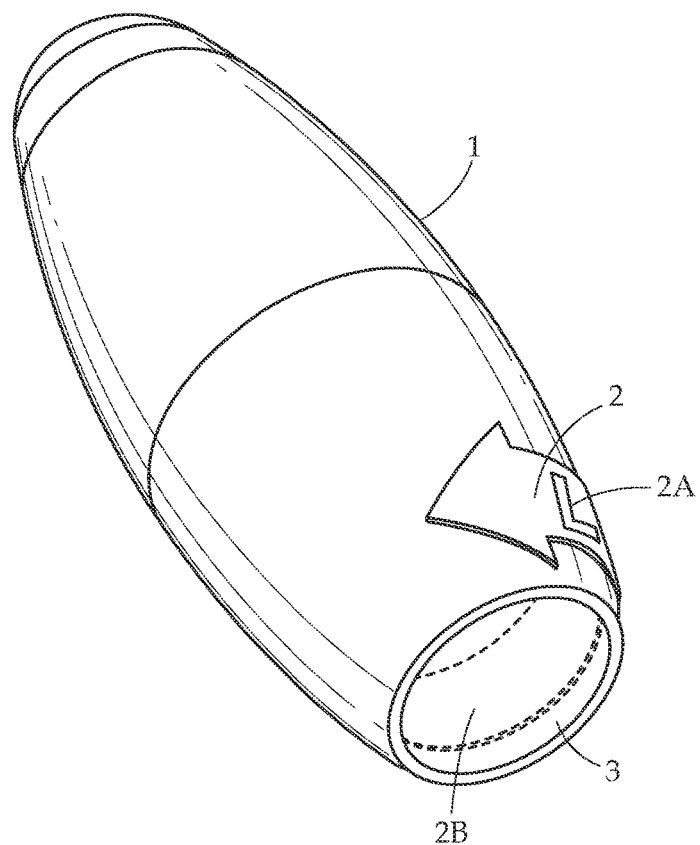
FIG. 1 provides a perspective view of an embodiment of the present invention.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a single-hand use collapsible anti-bacterial plunger combined with a base to facilitate the single-hand use feature of the plunger. The embodiments described herein may allow the user to collapse and extend the plunger with one hand and to conveniently store the plunger in either the collapsed or extended form.

The collapsing and extending features of the present disclosure are accomplished generally by creating an internally threaded aperture within a handle, attaching an externally threaded locking screw piece within the internally threaded aperture, and attaching the proximal end of a telescoping shaft within the locking screw piece.

In some embodiments, the telescoping shaft is made of a plurality of connected preceding and successive hollow rods having proximal and distal ends, wherein some hollow rods have internal threading at their distal ends, some have external threading at their proximal ends, and some have both. Each preceding hollow rod has a larger area than each successive hollow rods, which allows the shaft to fully collapse. The points where the externally threaded proximal ends and the internally threaded distal ends of the hollow rods connect are referred to as the "connection joints" of the telescoping shaft. The hollow rods may be made from many different types of material, including metal or aluminum material. In the fully extended position, the connection joints of the telescoping shaft are locked in place by the externally threaded proximal ends of successive hollow rods being screwed into the internally threaded distal ends of preceding hollow rods. The connection joints of the telescoping shaft may be unlocked by rotating the shaft in a clockwise direction until the external threading at the proximal ends of the successive hollow rods is no longer screwed into the internal threading at the distal ends of the preceding hollow rods, at which point each preceding hollow rod may be collapsed over each successive hollow rod until the shaft is fully collapsed. From a fully collapsed position, the shaft may be extended until the connection joints come into contact, at which point the shaft may be rotated in a counterclockwise direction until the connection joints become locked in place.

In some embodiments, the telescoping shaft is spring loaded. In these embodiments each successive hollow rod may have a spring at its proximal end that engages with the distal end of a preceding hollow rod. The springs may be in a fully extended or free length position when the telescoping shaft is in a fully extended configuration. Moreover, when the telescoping shaft is in a fully collapsed position, the springs may be in a fully compressed or operating length position. When the springs are in a fully compressed or operating length position, there may be some potential energy contained within the springs. When the user transitions the telescoping shaft from a collapsed configuration to a fully extended configuration, the potential energy of the springs is translated into kinetic energy, which may cause the springs to transition to a fully extended or free length position. The transition of the springs from a collapsed to an extended position may ensure that the connection joints of the telescoping shaft are in a proper position to twist and lock.

While the telescoping shaft provides the primary mechanism for collapsing and extending the plunger in some embodiments, the handle, the internally threaded aperture of the handle, and the externally threaded locking screw piece in combination with each other provides a mechanism that facilitates the single-handed collapsing and extending feature in other embodiments. One aspect of the single-handed collapsing and extending feature of the present disclosure is accomplished generally by having the handle engage with the locking screw piece to lock the handle and the screw piece in place, which may provide sufficient force to rotate the telescoping shaft in either a clockwise or counterclockwise direction.

In some embodiments, the externally threaded locking screw piece may have an aperture for inserting the proximal end of the telescoping shaft. Moreover, the locking screw piece may also have a female locking port that engages with a male locking port within the aperture of the handle when the handle is in a locked position. The handle may be in a locked position when the external threading of the locking screw piece is fully screwed into the internal threading of the aperture within the handle. When the handle is in a locked position, wherein the proximal end of the telescoping shaft is simultaneously inserted within the aperture of the locking screw piece, the handle may be twisted in a clockwise or a counterclockwise direction by the user, which may provide sufficient force to rotate the shaft and the connection joints in either direction for unlocking and locking the joints, respectively. When the telescoping shaft is extended and the connection joints are locked, the handle may be rotated in a counterclockwise direction, causing the female locking port of the locking screw piece to disengage with the male locking port within the aperture of the handle, allowing the telescoping shaft to further extend.

In other embodiments, the distal end of the telescoping shaft is connected to a suction cup. In some embodiments, a baffle may be further connected to the suction cup. The handle, the locking screw piece, the telescoping shaft, the suction cup, and, in some embodiments, the baffle all connected to each other is referred to as the "plunger." The plunger may be secured to a base having a foot tab, which may further facilitate the single-handed collapsing and extending feature of the present disclosure.

In yet other embodiments, the suction cup may have an annular ridge for engaging locking flaps of the base. When the annular ridge of the suction cup is engaged with the locking flaps of the base, a force, greater than the force of gravity, may be required to dislodge the plunger from the base. When the locking flaps of the base are engaged with the annular ridge of the suction cup, the plunger is said to be "locked to the base." When the plunger is locked to the base, the user may put their foot on the foot tab to stabilize the plunger while the user collapses and extends the shaft while twisting the handle with one hand. Moreover, when the plunger is locked to the base, rotation of the suction cup relative to the base may be prevented or may be significantly hindered by the friction between the annular ridge and the locking flaps. These are some of the ways that the base may facilitate the single-handed collapsing, twisting, and extending features of the present disclosure.

In other embodiments, the anti-bacterial feature of the present disclosure may be accomplished generally by covering or coating the telescoping shaft with an antimicrobial agent, such as a polymer-metal composite designed to have antimicrobial properties. In some embodiments, the polymer-metal composite may be polypropylene infused with silver ions, which may be referred to as "silver ions". In most embodiments, the anti-bacterial feature may be further accomplished by utilizing the base to assist the user with collapsing, twisting, and extending the plunger with one hand.

In yet other embodiments, the handle may be connected to a telescoping shaft, which may be connected to a brush. In some embodiments, the telescoping shaft may be connected to both a brush at its distal and a suction cup at its distal end, simultaneously. Moreover, in some embodiments, the base may be shaped for engaging with a brush, and in other embodiments, the base may be shaped for engaging both the brush and the suction cup.

Turning now to FIG. 1, which shows the handle 1 with a top and a bottom, wherein the bottom defines an aperture 3 extending into the handle 1. In some embodiments, the handle 1 may be comprised of directional instructions 2 and a word 2A, that tells the user (not shown) the direction to turn the handle 1 to accomplish the function described by the instructions 2 and the word 2A. The mold 2B of the instructions 2 may be seen within the aperture 3 of the handle 1.

Figure 2:
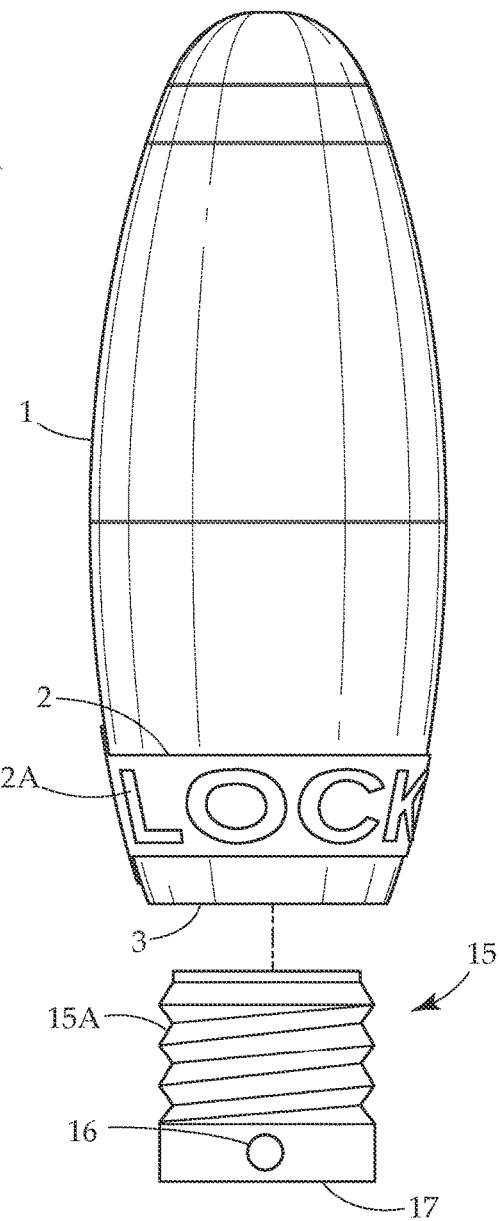
FIG. 2 provides a partially exploded perspective view of another embodiment of the present invention.

FIG. 2 shows a partially exploded embodiment of the handle 1, the instructions 2, the word 2A, and the aperture 3 alongside the locking screw piece 15. In some embodiments, the locking screw piece 15 may be comprised of external threading 15A, a female locking port 16, and an aperture 17 for inserting the telescoping shaft 4 (shown in FIG. 4).

FIG. 3 shows a partially exploded, cross-sectional embodiment of the handle 1 and locking screw piece 15. In some embodiments, the handle 1 may be in a locked position when the external threading 15A of the locking screw piece 15 is fully screwed into the internal threading 15B of the handle 1 so that the female locking port 16 is connected to the male locking port 16A. The telescoping shaft 4 (shown in FIG. 4) may be inserted and secured within the aperture 17 of the locking screw piece 15.

FIG. 4 shows an embodiment of the telescoping shaft 4 in its fully extended position. A first preceding hollow rod 4A at the proximal end of the telescoping shaft 4 may not have any external threading 14A (shown in FIG. 11) at its proximal end, where it is attached to the aperture 17 of the locking screw piece 15 (shown in FIG. 5); however, the first preceding hollow rod 4A may have internal threading 14B (shown in FIG. 11) at its distal end. In some embodiments, the first preceding hollow rod 4A has a spherical protrusion 4D at its distal end, which may engage with the circular holes 6 of the connector 7 (shown in FIG. 8) when the telescoping shaft 4 is in its fully collapsed position (shown in FIG. 13). FIG. 4 also shows a first successive or second preceding hollow rod 4B, which may have both external threading 14A at its proximal end and internal threading 14B at its distal end (shown in FIG. 11). Finally, a second successive or final hollow rod 4C at the distal end of the telescoping shaft 4 may not have any internal threading 14B (shown in FIG. 11) at its distal end; however, it may have external threading 14A (shown in FIG. 11) at its proximal end. A hollow rod 4A at the proximal end of the telescoping shaft 4 may have a larger area than a hollow rod 4C at the distal end of the telescoping shaft. The telescoping shaft 4 may be covered by an antimicrobial agent (not shown).

Figure 5:
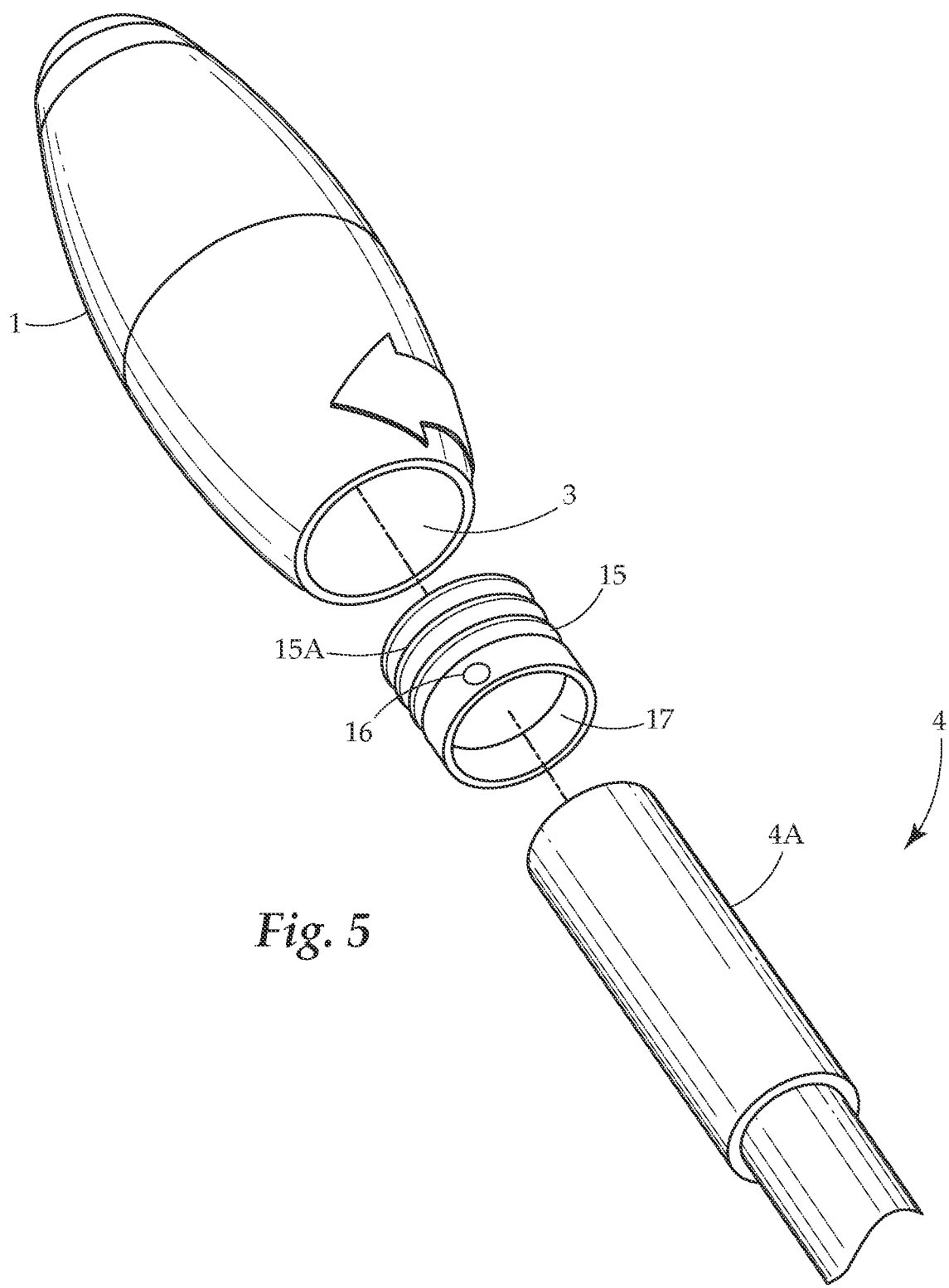
FIG. 5 provides a partially exploded perspective view of another embodiment of the present invention.
Figure 6:
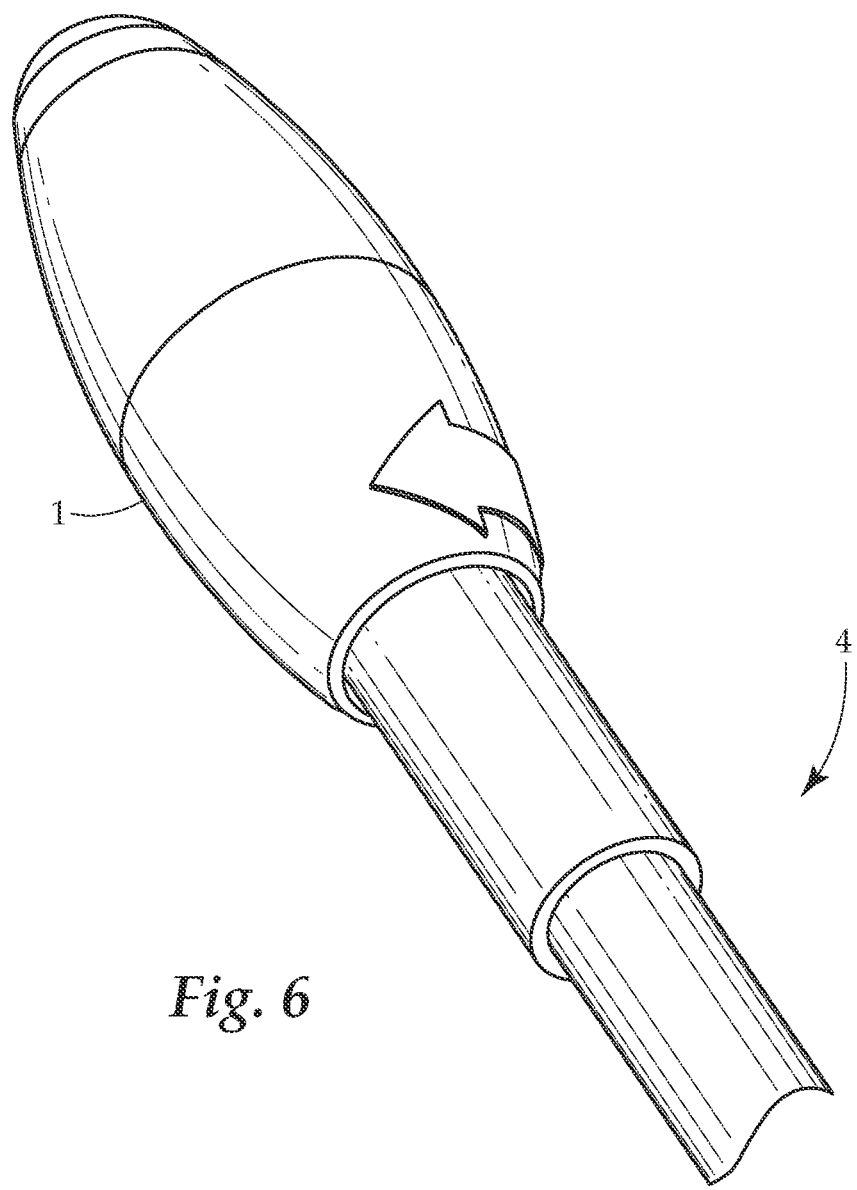
FIG. 6 provides a perspective view of another embodiment of the present invention.

FIG. 5 in conjunction with FIG. 6 show how the handle 1 connects to the proximal end of the telescoping shaft 4. FIG. 5 shows a partially exploded embodiment of the handle 1, the locking screw piece 15, and the proximal end of the telescoping shaft 4. The first preceding hollow rod 4A at the proximal end of the telescoping shaft 4 may be inserted into the aperture 17 of the locking screw piece 15, having external threading 15A and a female locking port 16, which may be further inserted into the aperture 3 of the handle 1. FIG. 6 shows the handle 1 connected to the telescoping shaft 4.

Figure 7:
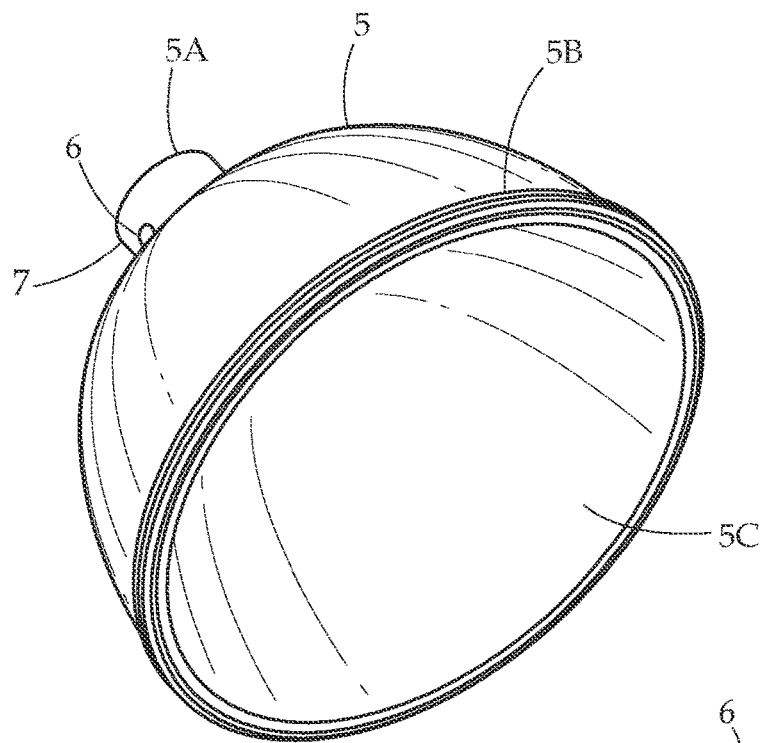
FIG. 7 provides a perspective view of another embodiment of the present invention.
Figure 8:
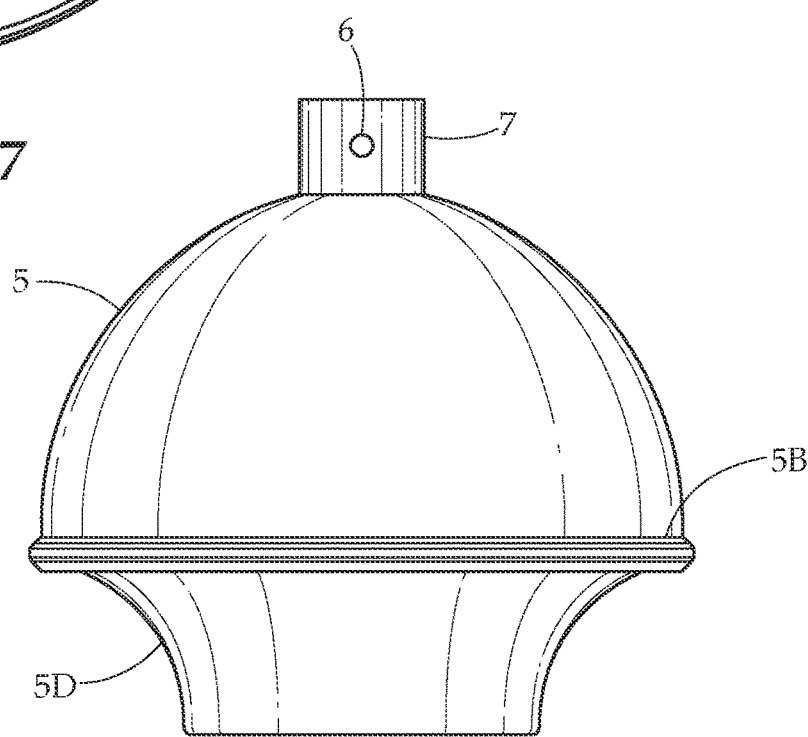
FIG. 8 provides a perspective view of another embodiment of the present invention.
Figure 9:
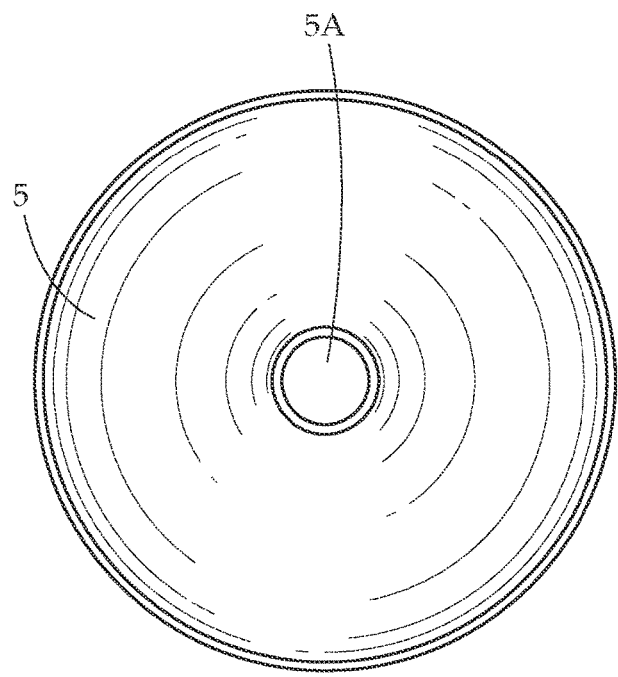
FIG. 9 provides a top-down perspective view of another embodiment of the present invention.

FIGS. 7, 8, and 9 show different perspective views of various embodiments of the suction cup 5 having a hemispherical shape with a rounded top 5A and a substantially flat bottom with a circumference. FIGS. 7 and 8 show different perspective views of various embodiments of connector 7 having a hollow cylindrical shape with a top and a bottom attached to the rounded top 5A, circular holes 6 defined within the top of the connector 7, and an annular ridge 5B encompassing the circumference of the bottom. FIG. 7 shows a perspective view of the substantially flat bottom of the suction cup 5 defining a concave indent 5C extending towards the rounded top 5A. FIG. 7 also shows that the concave indent 5C has a circumference substantially equal to the circumference of the bottom of the suction cup 5. FIG. 8 shows a perspective view of the hollow baffle 5D with a proximal, medial, and distal portion, where the proximal portion of the baffle 5D is connected to the circumference of the bottom of the suction cup 5. FIG. 8 also shows an embodiment of the baffle 5D where the circumference of the proximal portion of the baffle 5D is substantially equal to the circumference of the bottom of the suction cup 5, the circumference of the medial portion of the baffle 5D has a circumference less than the circumference of the proximal portion of the baffle 5D, and the distal portion of the baffle 5D has a circumference less than both the proximal and medial portions of the baffle 5D.

Figure 10:
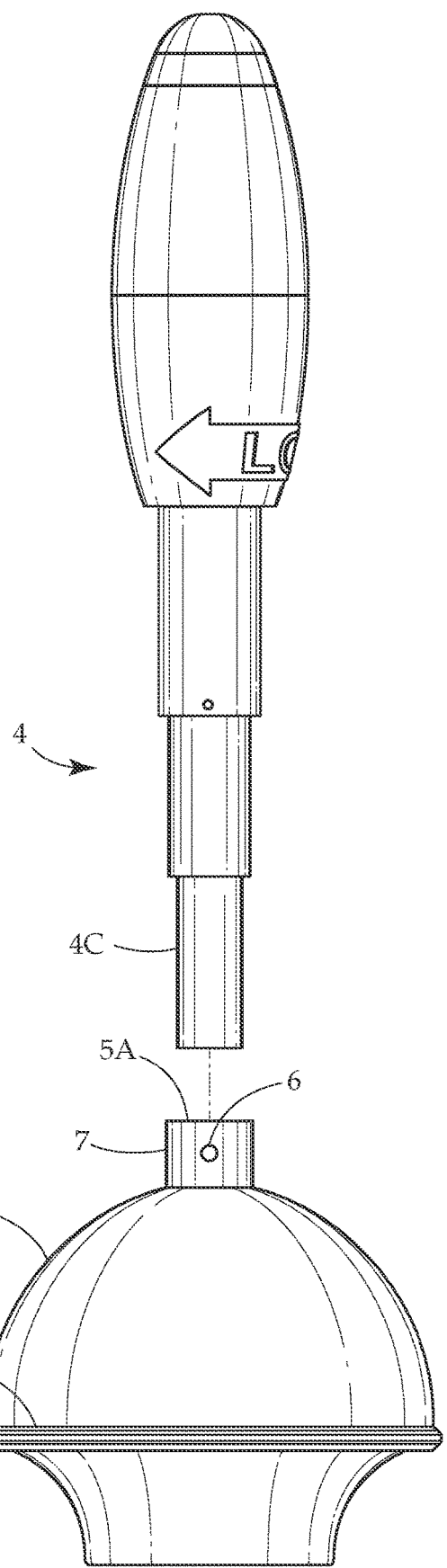
FIG. 10 provides a partially exploded perspective view of another embodiment of the present invention.

FIG. 10 shows a partially exploded embodiment of the telescoping shaft 4, which may be connected at its distal end to connector 7 by connecting final hollow rod 4C to connector 7 until final hollow rod 4C comes into contact with the rounded top 5A of the suction cup 5. In some embodiments, circular holes 6 engage with spherical protrusions 4D (shown in FIG. 4) when telescoping shaft 4 is in its fully collapsed position (shown in FIG. 13). Additionally, annular ridge 5B may engage with locking flaps 12 when the suction cup 5 is inserted into base 9 (shown in FIG. 17).

Figure 11:
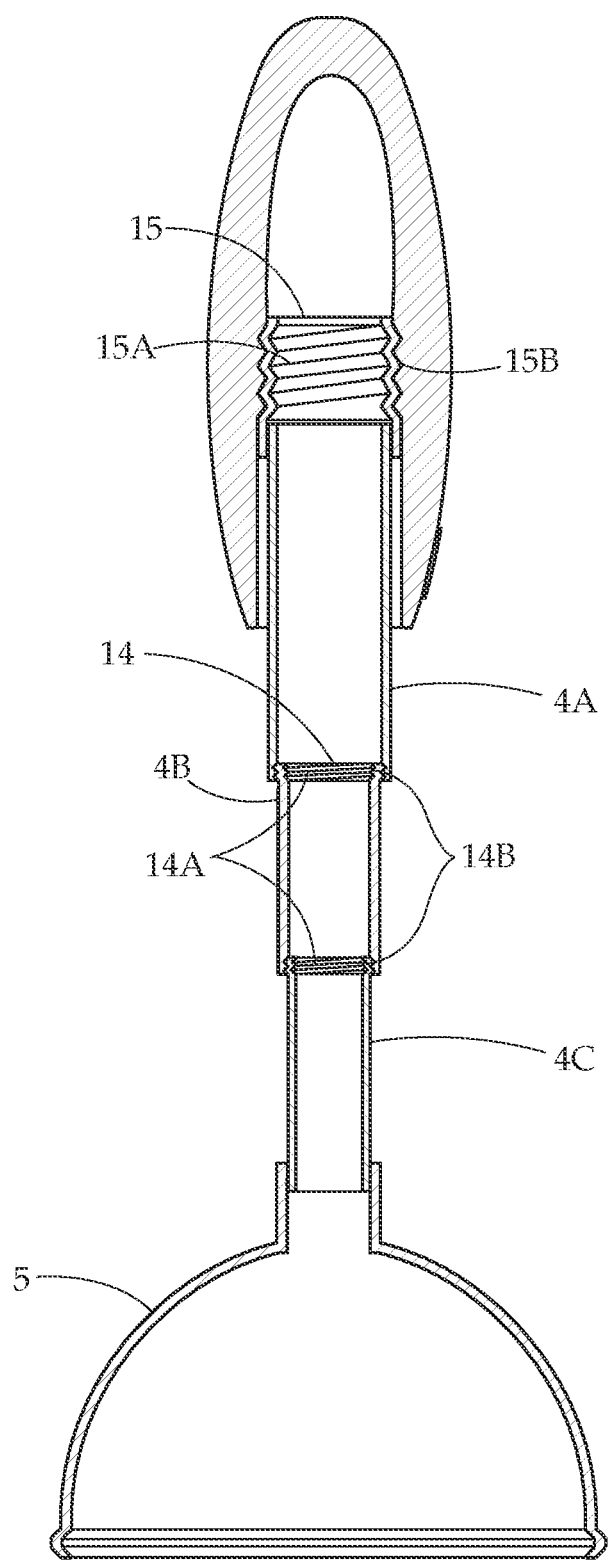
FIG. 11 provides a cross-sectional perspective view of another embodiment of the present invention.

FIG. 11 shows a cross-sectional embodiment of the handle 1 with internal threading 15B, connected to the locking screw piece 15 with external threading 15A. A portion of first preceding hollow rod 4A is inserted inside both handle 1 and locking screw piece 15, and a portion of final hollow rod 4C is connected to suction cup 5. Both first preceding hollow rod 4A and first successive hollow rod 4B have internal threading 14B at their distal ends, and first successive hollow rod 4B and final hollow rod 4C have external threading 14A at their proximal ends. The points where external threading 14A and internal threading 14B are connected to each other is referred to as connection joints 14.

Figure 12:
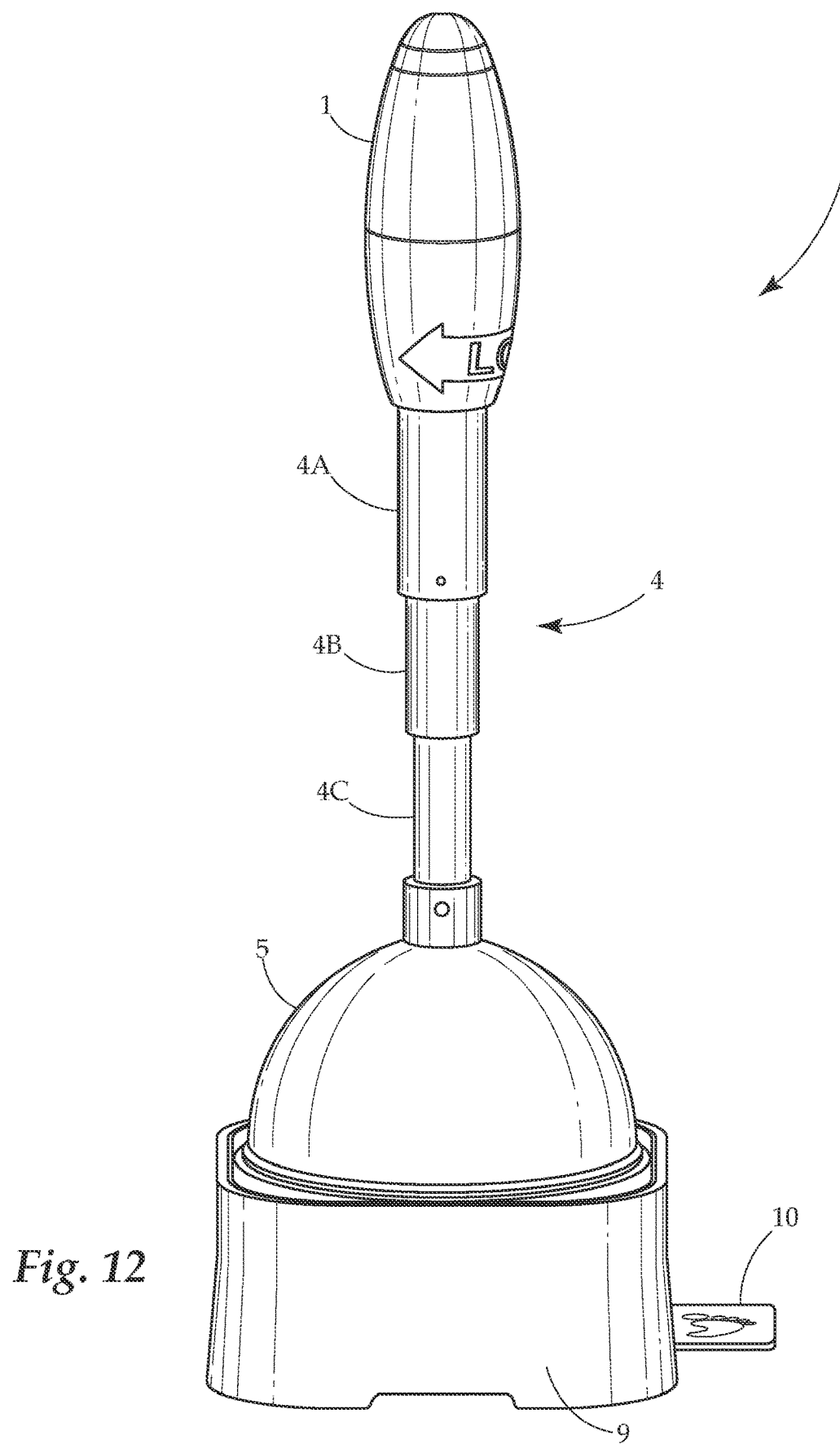
FIG. 12 provides a perspective view of another embodiment of the present invention.
Figure 13:
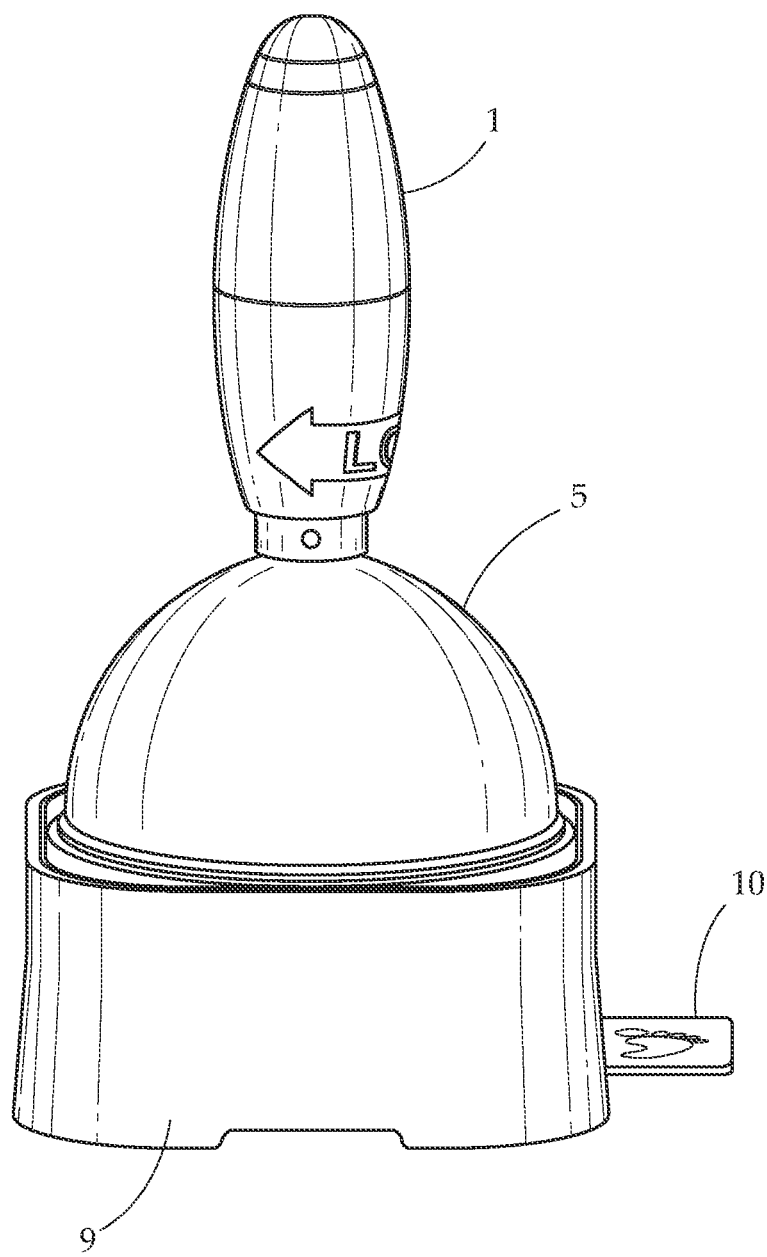
FIG. 13 provides a perspective view of another embodiment of the present invention.

FIGS. 12 and 13 show different embodiments of the plunger 8 connected to the base 9 having a body with a volume, having foot tab 10, in its fully extended and fully collapsed configurations, respectively. FIG. 12 shows that handle 1, telescoping shaft 4, comprised of hollow rods 4A, 4B, and 4C, and suction cup 5 are visible in the extended position. However, FIG. 13 shows that only handle 1 and suction cup 5 are visible in the collapsed position.

Figure 14:
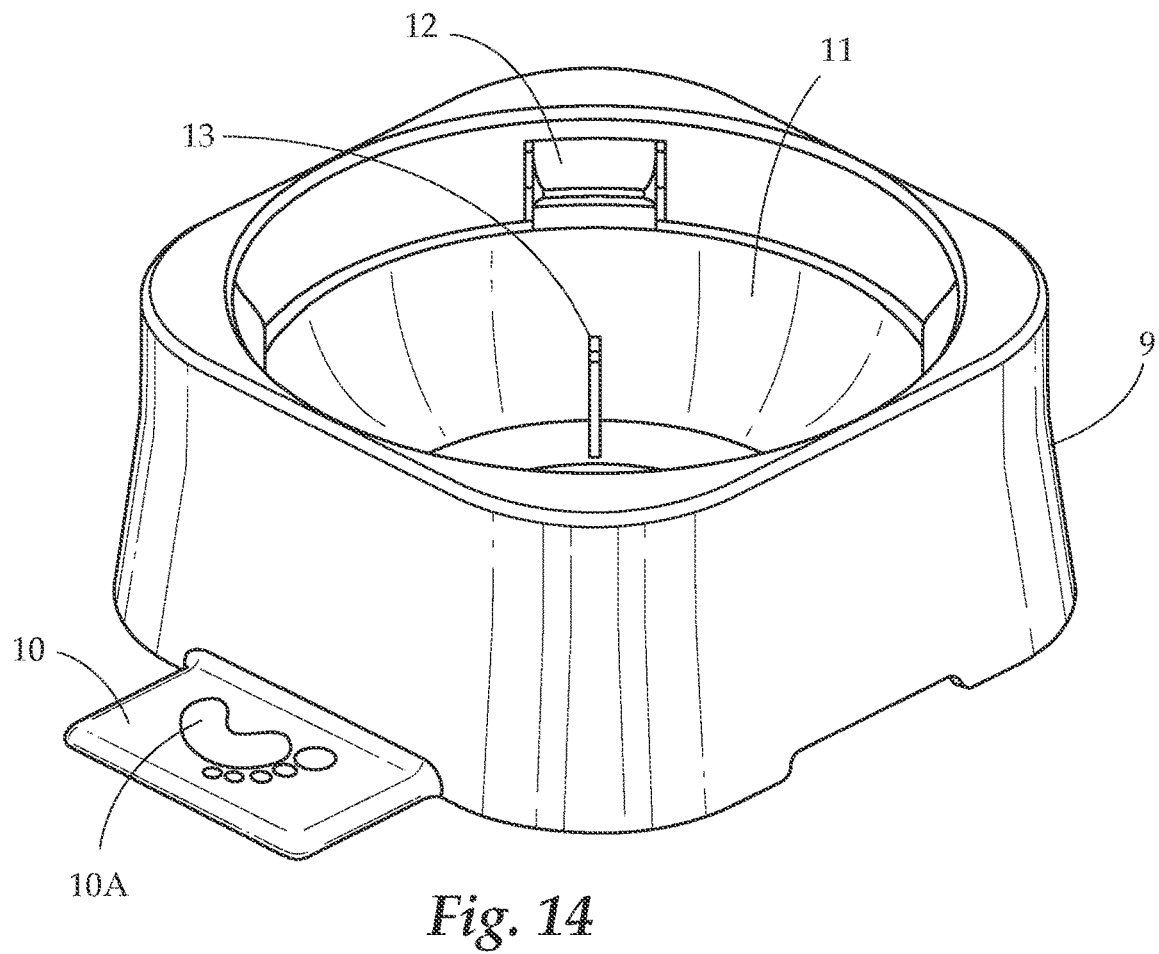
FIG. 14 provides a perspective view of another embodiment of the present invention.
Figure 15:
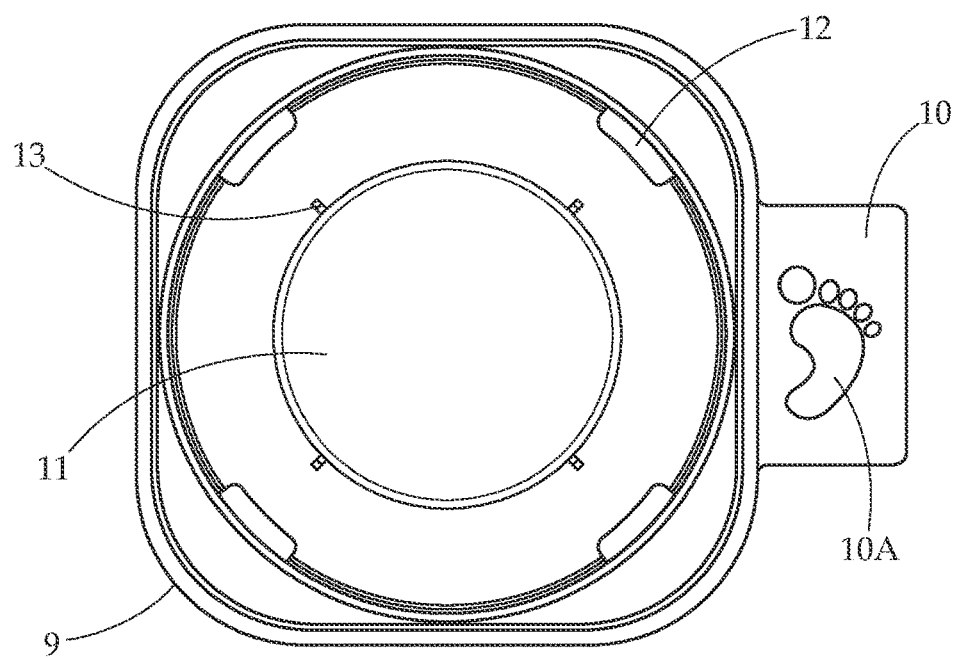
FIG. 15 provides a top-down perspective view of another embodiment of the present invention.

FIGS. 14 and 15 show different perspective views of embodiments of the base 9 with a body having a volume, having foot tab 10 on a side of the body of the base 9 and extending away from the body. FIGS. 14 and 15 both show that the base 9 defines an opening 11 on another side of the body with a hemispherical volume less than the volume of the body, where the suction cup 5 may be placed (shown in FIG. 13). FIGS. 14 and 15 also show the base 9 having locking flaps 12 and air vents 13. Some embodiments have pictorial instructions 10A on foot tab 10. FIG. 14 also shows an embodiment where the foot tab 10 is attached to another side of the body of the base 9 perpendicular to the side of the body of the base 9 where the opening 11 is defined.

Figure 17:
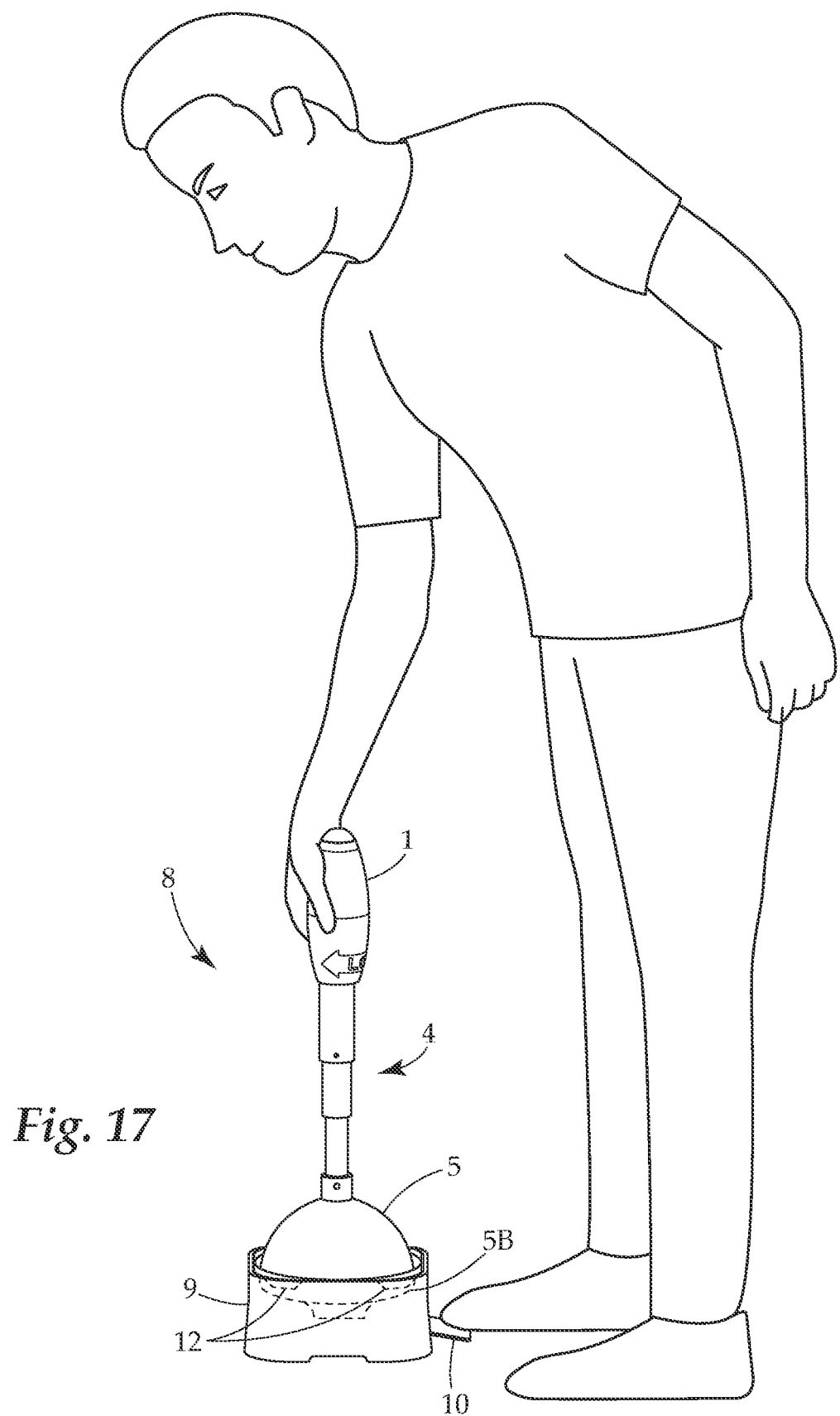
FIG. 17 provides a perspective view of a person using another embodiment of the present invention.

FIGS. 16 and 17 show the plunger 8 being placed into base 9 by lining up the annular ridge 5B of the suction cup 5 with locking flaps 12. FIGS. 16 and 17 also show that there is enough space within the base 9 to fit baffle 5D connected to the suction cup 5 in some embodiments. FIG. 17 shows that the user may use foot tab 10 for stability when engaging or disengaging annular ridge 5B with locking flaps 12.

Figure 18:
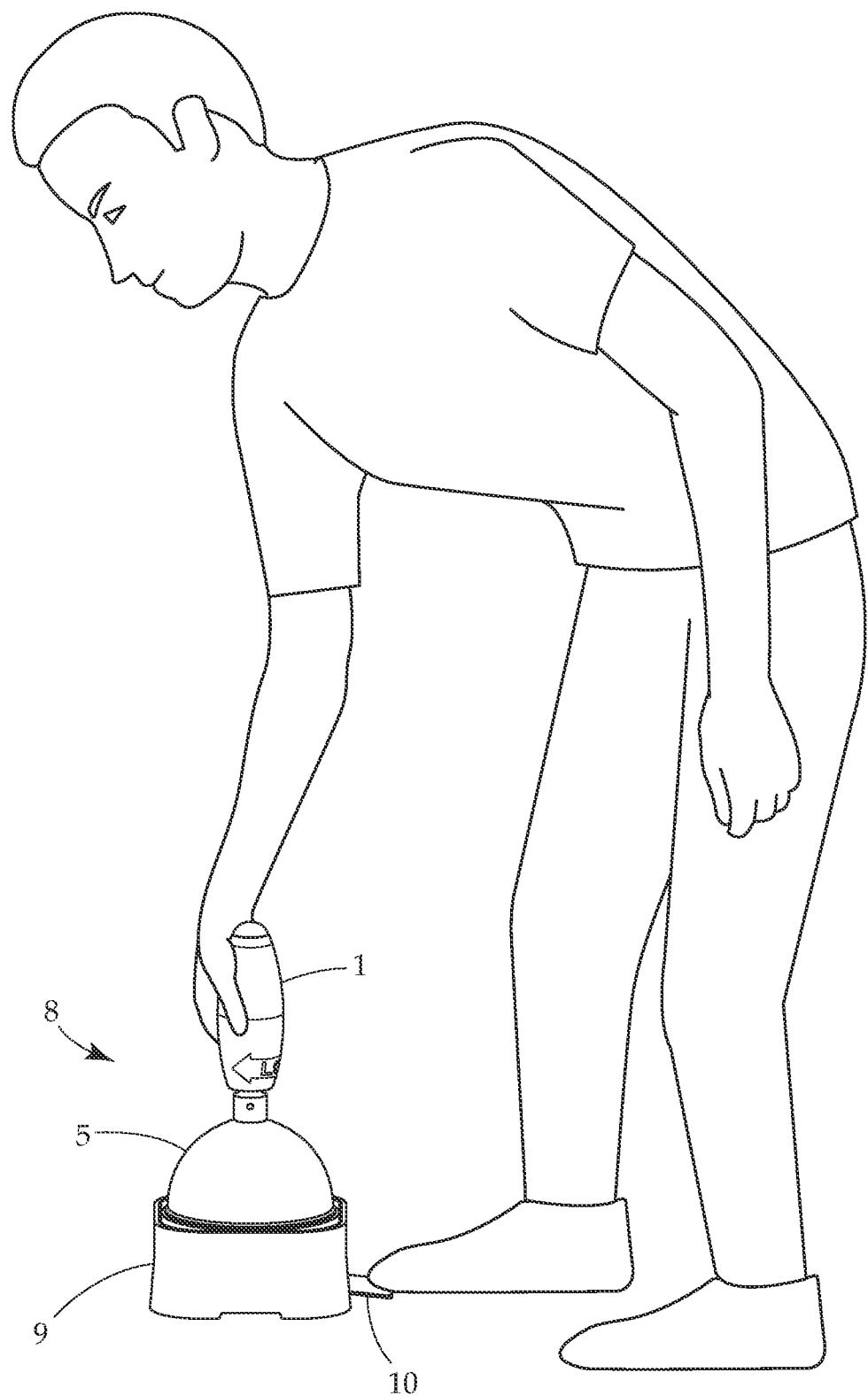
FIG. 18 provides a perspective view of a person using another embodiment of the present invention.

FIGS. 17 and 18 show the user actively transitioning the plunger 8 from its fully extended position to its collapsed position, respectively. FIG. 17 shows that the user may use foot tab 10 to stabilize the base 9 while applying force to twist handle 1 and, in turn, telescoping shaft 4 when handle 1 is in its locked position. The twisting force causes the connection joints 14 (shown in FIG. 11) to unlock, allowing telescoping shaft 4 to collapse. The user may also use foot tab 10 to stabilize base 9 and, in turn, the plunger 8 when transitioning the plunger 8 from a collapsed position to an extended position.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth below.

What is claimed is:

1. A collapsible plunger comprising:
   a handle, the handle connected to a telescoping shaft, having a proximal and a distal end, at the proximal end; the telescoping shaft connected to a suction cup at the distal end; and
   a base, separate from the plunger, having an opening where the suction cup may be placed;
   wherein the suction cup comprises a hemispherical shape with a rounded top and a substantially flat bottom with a circumference, wherein the bottom defines a concave indent extending towards the rounded top, the concave indent having a circumference substantially equal to the circumference of the bottom, and a connector attached to the rounded top; and
   wherein the connector comprises a hollow cylindrical shape with a top and a bottom, wherein the top defines a plurality of circular holes, and the telescoping shaft further comprises at least one spherical protrusion.

2. The collapsible plunger of claim 1, wherein the base comprises a body with a volume which defines the opening comprising a hemispherical volume with a volume less than the volume of the body on a side of the body, and a foot tab attached to another side of the body and extending away from the body.

3. The collapsible plunger of claim 1, wherein the handle comprises a top and a bottom, wherein the bottom defines an aperture extending into the handle, the handle further comprising an internal threading within the aperture for engaging an external threading of a locking screw piece, the locking screw piece further comprising another aperture for attaching the proximal end of the telescoping shaft, which provides a locking mechanism for locking the handle in place to facilitate twisting the telescoping shaft.

4. The collapsible plunger of claim 3, wherein the telescoping shaft comprises a plurality of connected hollow rods and connection joints, wherein a hollow rod at the proximal end of the telescoping shaft comprises a larger area than a hollow rod at the distal end of the telescoping shaft.

5. The collapsible plunger of claim 4, wherein the telescoping shaft further comprises an antimicrobial agent.

6. The collapsible plunger of claim 1, wherein the suction cup further comprises an annular ridge that encompasses the circumference of the bottom.

7. The collapsible plunger and base of claim 1, wherein the suction cup further comprises a hollow baffle with a proximal, a medial, and a distal portion, wherein the proximal portion of the baffle is connected to the circumference of the bottom.

8. The collapsible plunger of claim 1, wherein the hollow rod at the distal end of the telescoping shaft is attached to the connector.

9. The collapsible plunger of claim 7, wherein the proximal portion of the baffle comprises a circumference substantially equal to the circumference of the bottom, the medial portion of the baffle comprises a circumference less than the circumference of the proximal portion, and the distal portion of the baffle comprises a circumference less than both the proximal and medial portions.

10. The collapsible plunger of claim 8, wherein the base comprises a body with a volume, wherein the body defines the opening comprising a hemispherical volume with a volume less than the volume of the body on a side of the body, and a foot tab attached to an other side of the body perpendicular to the side where the opening is defined.

11. The collapsible plunger of claim 10, wherein the base further comprises at least one locking flap and at least one air slot within the opening.

12. A collapsible plunger comprising:
- a handle having a top and a bottom, wherein the bottom defines an aperture extending into the handle, and the handle further comprises an internal threading within the aperture for engaging an external threading of a locking screw piece with another aperture, which provides a locking mechanism for locking the handle in place;
- a telescoping shaft having a proximal and a distal end, wherein the telescoping shaft comprises a plurality of connected hollow rods and connection joints, wherein a hollow rod having a top and a bottom portion at the proximal end of the telescoping shaft comprises a larger area than a hollow rod at the distal end of the telescoping shaft;
- the external threading of the locking screw piece screwed into the internal threading of the aperture within the handle and the top portion of the hollow rod at the proximal end of the telescoping shaft secured within the other aperture of the locking screw piece;
- a suction cup comprising a hemispherical shape with a rounded top and a substantially flat bottom with a circumference, wherein the bottom defines a concave indent extending towards the rounded top, the concave indent having a circumference substantially equal to the circumference of the bottom, and a connector attached to the rounded top;
- the hollow rod at the distal end of the telescoping shaft connected to the connector of the suction cup; and
- a base, separate from the plunger, having an opening where the suction cup may be placed, wherein the base comprises a body with a volume, wherein the body defines the opening comprising a hemispherical volume with a volume less than the volume of the body on a side of the body, and a foot tab attached to an other side of the body perpendicular to the side where the opening is defined.

13. The collapsible plunger of claim 12, wherein the telescoping shaft further comprises silver ions for antibacterial properties.

14. The collapsible plunger of claim 12, wherein the suction cup further comprises a hollow baffle with a proximal, a medial, and a distal portion, wherein the proximal portion of the baffle comprises a circumference substantially equal to the circumference of the bottom and is connected to the circumference of the bottom, the medial portion of the baffle comprises a circumference less than the circumference of the proximal portion, and the distal portion of the baffle comprises a circumference less than the medial and the proximal portions.

15. The collapsible plunger of claim 12, wherein the suction cup further comprises an annular ridge that encompasses the circumference of the bottom and the connector comprises a hollow cylindrical shape with a top and a bottom, wherein the top defines a plurality of circular holes having areas, and the telescoping shaft further comprises at least one spherical protrusion.

16. The collapsible plunger of claim 14, wherein the suction cup further comprises an annular ridge that encompasses the circumference of the bottom and the connector comprises a hollow cylindrical shape with a top and a bottom, wherein the top defines a plurality of circular holes, and the telescoping shaft further comprises at least one spherical protrusion.

17. The collapsible plunger of claim 15, wherein the handle and the base further comprise instructions.

18. The collapsible plunger of claim 16, wherein the base further comprises at least one locking flap and at least one air slot within the opening.

* * * * *